United States Patent [19]

Romero

[11] Patent Number: 4,601,959
[45] Date of Patent: Jul. 22, 1986

[54] VENT CONSTRUCTION FOR BATTERIES

[75] Inventor: Antonio Romero, Parkton, Md.

[73] Assignee: Saft America, Inc., Valdosta, Ga.

[21] Appl. No.: 601,237

[22] Filed: Apr. 17, 1984

[51] Int. Cl.$^4$ ............................................. H01M 2/12
[52] U.S. Cl. ...................................... 429/56; 429/53;
215/253; 220/367; 220/207; 220/266
[58] Field of Search .................... 429/53, 56; 220/207,
220/266, 281, DIG. 27, 367; 215/253

[56] References Cited

U.S. PATENT DOCUMENTS

| | | | |
|---|---|---|---|
| 3,204,156 | 8/1965 | Moresi et al. | 429/56 X |
| 3,850,339 | 11/1974 | Kinkel | 220/367 X |
| 3,851,782 | 12/1974 | Clawson et al. | 215/253 X |
| 3,918,610 | 11/1975 | Willis | 220/207 X |
| 4,175,166 | 11/1979 | Rosansky | 429/56 |
| 4,256,812 | 3/1981 | Tamura et al. | 429/56 |
| 4,484,691 | 11/1984 | Lees | 429/56 X |

*Primary Examiner*—Brian E. Hearn
*Assistant Examiner*—Stephen J. Kalafut
*Attorney, Agent, or Firm*—Russell E. Hattis

[57] ABSTRACT

In a preferably cylindrical sheet metal casing to be hermetically sealed and having a thinwall portion, the improvement in a vent for the casing which ruptures when internal casing pressure exceeds a given value, the vent including at least one vent-forming rib projecting outward from a circular end wall thereof, said rib having formed therein a vent-forming groove which extends transversely of the length of the rib only part way along the transverse contour thereof, so that the groove ends are spaced from the base of the rib preferably a distance at least equal to the end wall thickness.

17 Claims, 12 Drawing Figures

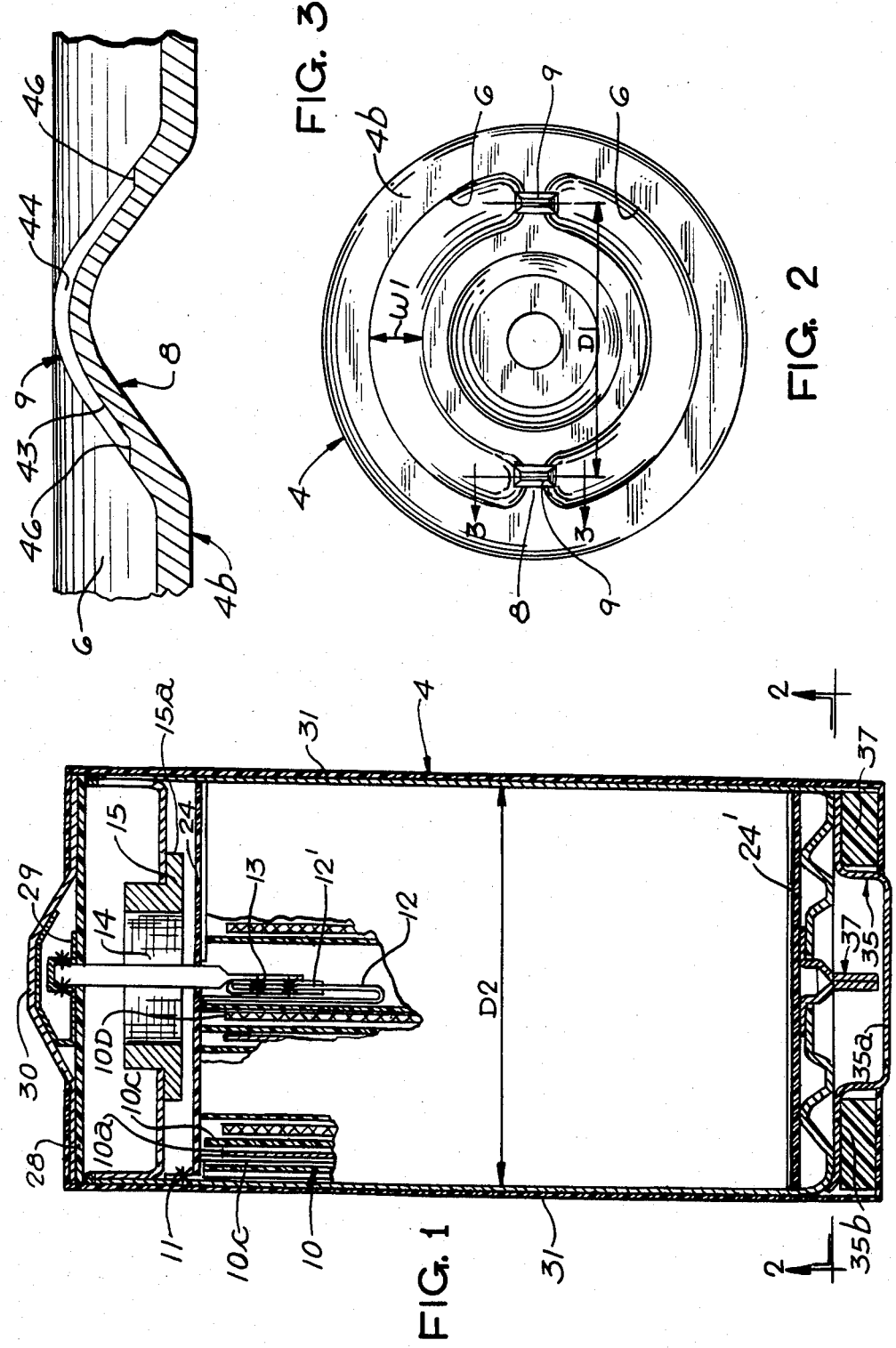

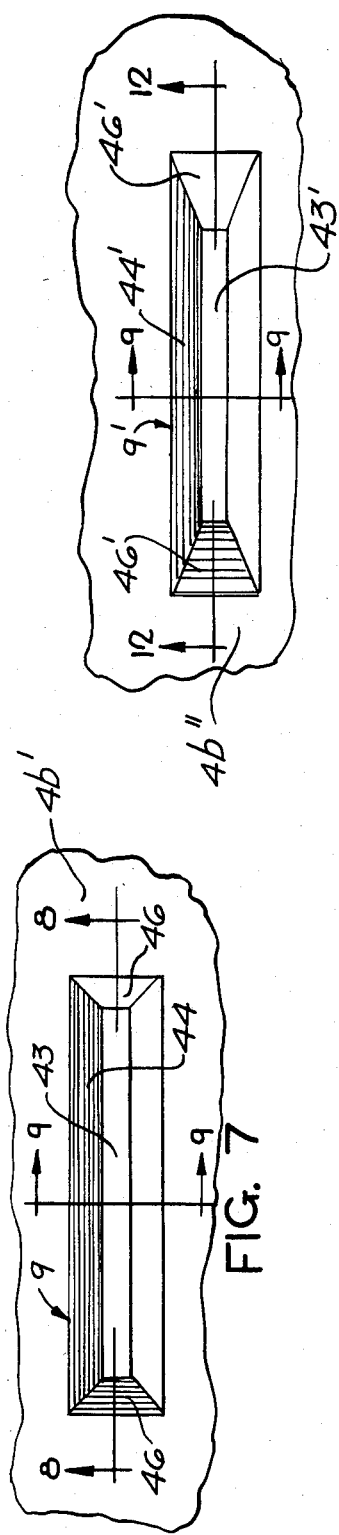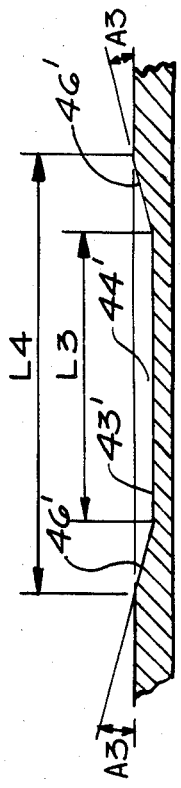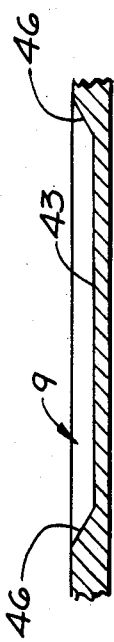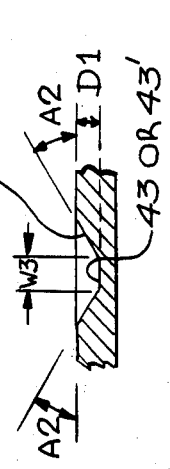

VENT CONSTRUCTION FOR BATTERIES

TECHNICAL FIELD OF THE INVENTION

The present invention has its most important application to the venting of pressures within hermetically sealed electrical batteries. In particular, the present invention has its greatest utility in the venting of lithium sulphur dioxide batteries.

BACKGROUND OF THE INVENTION

For safety reasons, it is important to prevent the buildup of dangerous pressures within battery casings by venting the battery when pressure begins to approach pressures which would otherwise cause explosion of the battery casing and consequent danger to people and property in the vicinity thereof. To this end, battery casing of lithium sulphur dioxide batteries which are hermetically sealed by welded joints have been provided with grooved thin wall sections which will rupture at an abnormally high pressure to relieve the pressure within the battery casing prior to the time the pressure reaches the point where the casing would generally explode to create hazardous conditions.

The present invention relates to an improvement in the type of vent disclosed in U.S. Pat. Nos. 4,109,135 and 3,918,610. The former patent discloses a casing pressure relieving vent in FIGS. 8 and 9 comprising a rib formed by deforming part of a grooved sheet metal end wall of a cylindrical casing to form an elongated casing projection or rib intersecting the pre-formed groove so that the groove extends transversely across the rib, that is down to and generally beyond the base of the rib. Internal casing pressure buildup places stresses on the rib which, when the venting pressure is reached, ruptures the rib along the groove. The grooves are stated to be formed by score lines which is presumed to involve cutting rather than coining the groove. However, it is not believed unique to coin rather than cut vent-forming grooves.

A variation of this grooved vent-forming rib is shown in the latter patent wherein a pair of such ribs are located between a pair of banana-shaped indentations extending inwardly from the general plane of the circular end wall of the casing and falling along a circle concentric with the circular configuration of the margins of the casing end wall. When the pressures inside the casing reaches an abnormally high but still safe value, the indentations begin to flatten. This places stresses on each grooved rib which fractures along the groove when the venting pressure is reached.

I discovered that certain advantages result by modifying the design of the vent-forming grooves in these ribs. It was apparently believed by the designers of these grooved vent-forming ribs that to be effective the grooves had to extend down to the base of the ribs. However, I discovered that such is not the case, and I also found that when the groove extends to the base of a rib it can cause undue weakening of the end wall causing it to rupture at the base of the rib in advance of the desired venting pressure.

SUMMARY OF THE INVENTION

Thus, in accordance with one of the features of the present invention, the vent-forming groove, preferably formed by compressing or coining rather than cutting the metal of the casing prior to the formation of the rib, is greatly shortened so that when the rib is ultimately formed the vent-forming groove extends only part way along the transverse contour of the rib. The groove ends are spaced sufficiently far from the base of the rib that any expected shifting of the groove location due to manufacturing tolerances will not position an end of the groove at or very near the base of the rib.

While the rib could have a variety of transverse profiles, it is preferably of sinusoidal shape, and the base of the rib merges generally smoothly into the casing wall at the base of the rib. Also, the vent-forming groove viewed in transverse cross-section preferably (but not necessarily) has a flat narrow bottom margin and outwardly flaring side margins.

In the initially constructed forms of the invention, the ends of the coined groove terminated fairly abruptly. This is believed to cause unexpectedly damaging stresses and variations in the metal structure which made it more prone to corrosive attack by the battery electrolyte, which unduly weakened the rib at the groove ends. Why this should occur only at the groove ends is not understood. Thus, in accordance with an improved form of the present invention, the depth of the end portions of a coined groove is reduced very gradually so that the stresses on and modification of the grain structures of the metal is reduced at the more critical end portions of the groove. By forming a vent-forming groove of much lesser extent than previously thought desirable, the strength and integrity of the end wall and the reliability of the vent structure are improved.

The previously described and other features of the invention will become apparent upon making reference to the specification to follow the claims and the drawings.

DESCRIPTION OF DRAWINGS

FIG. 1 is a vertical sectional view through a typical lithium sulphur dioxide battery;

FIG. 2 is a transverse section through the general plane of the bottom wall of the battery casing and showing the form of the invention where the bottom wall includes a pair of banana-shaped indentations separated by a pair of ribs with unique vent-forming grooves extending transversely of the rib profile;

FIG. 3 is a greatly enlarged fragmentary transverse sectional view through one of the ribs shown in the bottom casing wall of FIG. 2, taken along section line 3—3 thereof;

FIG. 7 is a greatly enlarged plan view of one of the coined grooves shown in FIG. 6;

FIG. 8 is a longitudinal section through the vent-forming groove shown in FIG. 7, taken along section line 8—8 therein;

FIG. 9 is a transverse sectional view through the vent-forming groove shown in FIG. 7 or FIG. 11, taken along section line 9—9 therein;

FIG. 11 is a greatly enlarged plan view of the vent-forming groove used in the form of the invention shown in FIG. 10 when it is formed in a completely flat-end wall of the battery casing (i.e. before the aforementioned banana-shaped indentations are formed therein); and FIG. 12 is a longitudinal sectional view through the vent-forming groove shown in FIG. 11 taken along section lines 12—12 therein.

DESCRIPTION OF EXEMPLARY FORMS OF THE INVENTION SHOWN IN THE DRAWINGS

Figure 4:
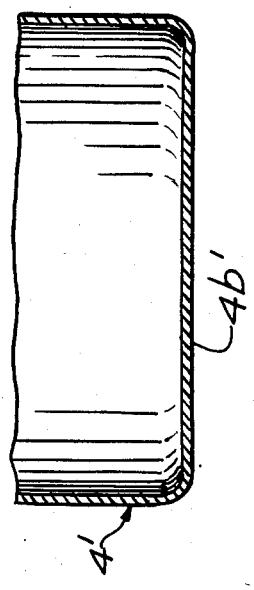
FIG. 4 is a fragmentary vertical sectional view through the bottom portion of the battery casing before the banana-shaped indentations and the vent-forming grooves of the invention are formed therein.
Figure 5:
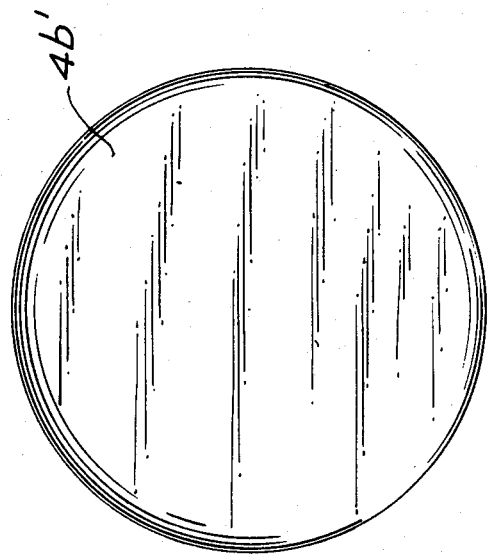
FIG. 5 is a bottom plan view of the casing of FIG. 4.
Figure 10:
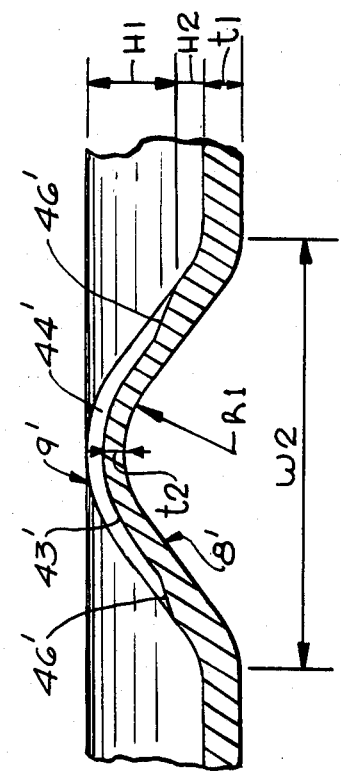
FIG. 10 is a greatly enlarged fragmentary transverse sectional view through a rib like that shown in FIGS. 2 and 3, but having a modified groove end configuration constituting the most preferred form of the invention.
Figure 6:
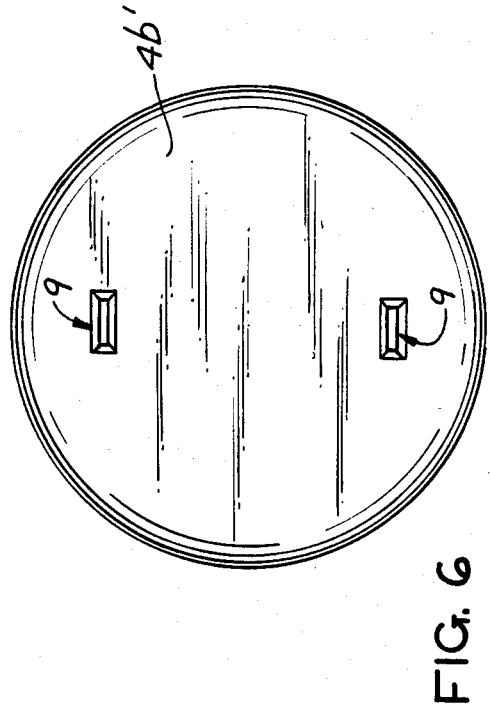
FIG. 6 is a view showing the application of a pair of coined vent-forming grooves in the outer surface of the end wall of the casing shown in FIGS. 4 and 5, prior to the formation of the banana-shaped indentations as shown in FIG. 2.

Before describing the unique vent construction of the present invention, reference should be made to FIGS. 1 and 2 which show the general construction of a typical lithium sulphur dioxide battery. As there shown, the battery includes a main cylindrical battery casing 4, which may be made of resilient sheet metal, preferably low carbon steel. The casing has a cylindrical initially open-top main body portion 4a bridged at the bottom thereof by a circular bottom end wall 4b. The bottom end wall 4b in its finished form has a pair of banana-shaped indentations 6—6 which are centered along a circle concentric with the center of the circular end wall. As previously indicated, the indentations 6—6 may be formed by pressing the initially flat end wall inwardly, leaving between the ends of the banana-shaped indentations radially extending ribs 8—8 which are of preferably sinusoidal shape in the central portions thereof, as shown in FIGS. 3 and 10. The peaks of these ribs are thus in the original plane of the casing end wall 4b. Extending transversely of the ribs 8—8 are unique vent-forming grooves 9—9 of the present invention to be described later in detail.

Contained within the casing 4 is a spiral wound assembly 10 of anode and cathode strips 10a and 10b separated by a separator strip 10c. A preferably copper connecting tab 11 extends from the negative lithium anode strip 10a, the tab 11 being welded to the inside wall of the battery casing 4. A preferably aluminum connecting tab 12 extends from the positive cathode strip, which is generally made of fine porous carbon balck carried on an aluminum grid, the tab 12 being connected to a depending preferably tantalum or molybdenum terminal 13 of a glass seal sub-assembly 15 through a U-shaped tab of the latter material. The terminal 13 is secured by a glass seal body 14 to an eyelet 15 of cold rolled steel material. The eyelet is welded to a cup-shaped cover 22 made preferably of low carbon steel and having flanges 15c preferably tig welded to the top of the inner surface of the battery casing 4.

An insulator disc 24 is located at the top of the spiral wound assembly 10 and a similar insulator disc 24' is located at the bottom of the assembly 10. Another insulator disc 28 is shown extending over the top of the battery casing. It has a central opening through which the glass seal assembly terminal 13 projects. A metal connecting member 29 preferably of cold rolled steel or nickel is shown interconnecting the top of the glass seal assembly terminal 13 and a dome-shaped outer terminal 30 preferably made of cold rolled steel. The terminal 30 is overlapped by an inturned end portion of shrink tubing 31 made of a flexible insulating material, like Mylar or the like which encloses the battery casing 4.

A pinched-off flanged filling tube 37 welded to the interior of the casing bottom end wall 4b projects downwardly from the casing through an opening in the casing end wall, and an outer terminal cap 35 preferably made of cold rolled steel covers over the casing bottom end wall. The cap 35 includes a flange 35b which is welded to the outer marginal portions of the bottom end wall 4b of the battery casing. An annular insulating ring 37 preferably made of plastic or fiber is shown surrounding the outside of the projecting central portion 35a of the terminal cap 35, the insulating ring being held in place by the inturned bottom end of the tubing 31.

The vent of the invention now to be described provides vent protection to the battery when the pressure of the battery reaches a given predetermined level. For example, in a ⅔A battery having a casing end wall thickness of about 0.012" over a range of internal pressures of about from about 35 to about 300 psi, the casing bottom end wall 4b desirably has a deflection of no more than about 0.010". When the internal can pressure reaches a narrow band of pressures nearing the point where the battery is to be vented, for example, a pressure in the range of from about 400 to about 500 psi, the banana-shaped indentations 6—6 desirably begin to flatten out. This creates tensions in the ribs 8—8 which should cause rupturing of one of the ribs along its vent-forming groove 9 when the threshold pressure is reached (e.g. 450 psi).

Refer now more particularly to FIG. 3 which illustrates the unique vent-forming groove 9 of the invention formed in each rib 8. While the rib 8 could have different configurations (like a flat-top rib), it is preferred that the transverse contour of the rib be as shown in FIG. 3 where the contour has a sinusoidal shape where the base of the rib smoothly merges into the bottom of the associated indentations 6 and the peak thereof is in the original plane of the casing bottom end wall 4b. Instead of the groove 9 extending to and beyond the base of the rib as in the prior art grooves, it is terminated preferably no more than about ¼ to ⅓ the overall height of the rib measured on the side of the rib where the groove is located when the groove is centered on the rib. This limitation provides leeway for manufacturing tolerances where the groove sometimes ends up off-centered on the rib, and assures that no groove end will be located at a point near the bottom of the rib base, (i.e. preferably no closer to the base of the rib than a distance of about the thickness of the casing end wall involved). If the end of a groove comes too close to the base of the rib, the groove can seriously weaken the structural strength of the end wall, resulting sometimes in premature rupturing of the rib at this point.

The vent-forming groove is preferably formed so that it is located on the outside of the rib involved since this simplifies the design of the rib-forming tooling. Also, the groove preferably has a constant depth except near the ends thereof and is coined rather than cut to simplify and make more accurate the groove-forming operations. Also, the transverse profile of the groove 9, as best shown in FIG. 9, preferably has a flat center portion 43 and outwardly tapering sides 44—44. In the initial design concept of the groove 9 as shown in FIG. 3, the groove abruptly terminated at the ends thereof.

Refer now to in FIG. 7, which shows the groove 9 coined into a flat casing end wall 4b' before the rib 8 is formed by depressing the flat end wall to form the indentations 6—6. As there shown, the tapering sides 44—44 of the groove 9 extend to the very ends of the groove and the flat bottom portion 43 of the groove joins short end wall portions 46—46. A coining tool is used having the configuration of the groove 9 as shown also in the sectional views of FIGS. 8 and 9.

As previously indicated, the groove 9 is preferably centered on the rib 8 formed between the ends of a pair of indentations 6—6, and the ends of the groove terminate substantially short of the base of the rib. Preferably, the ends of the groove 9 are spaced from the bottom of the rib (i.e. the bottom of the indentations 6—6) no more than about ¼-⅛ of the height of the rib, so that if the tolerances in the operation which forms the recesses 6—6 result in the groove being off-centered on the rib, the end of the groove nearest the base of the rib will still be spaced from the bottom of the recess a distance no less than about the thickness of the casing end wall.

It was unexpectedly discovered that the manner in which a coined vent-forming groove 9 is terminated at the ends thereof has a substantial effect on the reliability of the vent involved. Thus, if the end of groove is terminated abruptly as shown in FIG. 3, the overall compressive forces applied to the metal are believed to create points of weakness in the metal structure only at the ends of the groove, which render the metal more subject to corrosive attack by the electrolyte used in the batteries. (This electrolyte for lithium sulphur dioxide batteries comprises lithium bromide, acenonitrile and a cathode depolarizer of sulphur dioxide.) Accordingly, while the overall groove length need not disturbed, in accordance with the form of the preferred and improved invention shown in FIG. 10, the full depth groove portion in the modified groove 9' there shown is shortened from that present in the groove shown in FIG. 3, and the ends there joins relatively long inclined wall portions 46'—46' much longer than the corresponding wall portions 46—46 in the embodiment of FIG. 7. In such case, in the completed battery the wall portions 46'—46' make a large angle nearing 180° with the general contour of the rib, as shown in FIG. 10. Referring more particularly to FIG. 12, this result is achieved by increasing the length of the groove end wall portions 46'—46' when it is initially coined into the flat casing bottom wall 4b" and shortening the bottom wall 43'. In so doing, a lesser volume of material is compressed or coined at the end portin of the groove 9', which decreases the compressive stresses on the metal structure at the groove ends where such stresses can adversely affect the strength and integrity of the casing end wall. The transverse profile of the groove 9' is preferably the same as that shown in FIG. 9 also applicable to the groove 9.

The specific angles, dimensions and tolerances of the vent structure described which are believed to make the most effective vent depend upon the particular size of the cell involved. A specific example of a vent design found by trial and error to be most effective for a ⅔ size battery made of low carbon nickel plated steel sheet metal 0.012" thick (t1 in FIG. 10) and with an inside diameter of 0.600" (D2 in FIG. 1) for the preferred groove configuration shown in FIG. 10 for venting a pressure of about 480 psi are as follows:

Depth of Depression 6 (H1+H2 in FIG. 10)—0.032"±0.0025"
Width of Depression 6 (W1 in FIG. 2)—0.080"
Diameter of circle on which depression 6 and grooves 9 are centered (D1 in FIG. 2)—0.387"±0.0025
Width of rib 8' at the center thereof (W2 in FIG. 10)—0.100"
Angle subtended by rib 9' (A1 in FIG. 10)—53°
Radius of peak of inner margin of rib (R1 in FIG. 10)—0.035"±0.005"
Overall length of groove 9' (L4 in FIG. 12)—0.135"
Width of groove bottom 43' (W3 in FIG. 9)—0.010"±0.002"
Angle of groove side wall 44' (A2 in FIG. 9)—30°±0.5°
Angle of groove end walls 46' (A3 in FIG. 12)—15°±0.5°
Depth of groove 9' (D1 in FIG. 9)—0.007"
Thickness of metal left by groove 9' (t2 in FIG. 10)—0.005"±0.0005"

As previously explained, the features of the present invention are applicable both to a vent structure using banana-shaped indentations disclosed in U.S. Pat. No. 3,818,610 and in the vent structure disclosed U.S. Pat. No. 4,105,133 which does not have such indentations. In the latter case, the rib involved is made by deforming the casing end wall outwardly from the general plane of the end wall. In such case, the peak of the rib is spaced above the plane of the end wall, whereas the peaks of the ribs 8 and 8' are in the generaly plane of the end wall since the indentations 6—6 which form these ribs are formed by depressing portions of the end wall inwardly thereof.

It should be understood that numerous modifications may be made in the forms of the present invention previously described and shown in the drawings without deviating from the broader aspects thereof.

I claim:

1. In a battery casing to be hermetically sealed, said casing having main side walls with end walls bridging the end portions of said side walls, at least one of said end walls facing and being exposed to the battery interior, the improvement in vent means for the casing which ruptures when internal casing pressure exceeds a given value, said vent means including at least one vent-forming rib of a given length and width projecting outward from a portion of said end wall normally facing the battery interior, said rib being in a central band or segment of said one end wall and oriented so that the length of the rib is parallel to said band or segment; and said rib having formed therein a vent-forming groove which extends transversely of the length of the rib only part way substantially symmetrically along the transverse contour thereof, so that both ends of the groove are spaced from the base of the rib and the groove extends comparable distances on both sides of the top or center point of the rib contour.

2. The battery casing of claim 1 wherein said exposed casing wall portion is an initially generally flat end wall in which said grooved rib was formed by first forming the groove in said end wall and then deforming the end wall to form a rib intersecting the groove.

3. The battery casing of claim 2 wherein the groove ends are spaced sufficiently far from the base of the rib that expected shifting of the groove location due to manufacturing tolerances will not position an end of the groove at the base of the rib.

4. The battery casing of claim 1 wherein said groove is formed in the outer surface of the rib.

5. The battery casing of claim 1 wherein said casing is formed of resilient sheet metal.

6. The battery casing of claim 1 wherein said casing is made of sheet metal, said one end wall extends generally in a given plane, and the peak of said rib is in said plane, said one end wall on opposite sides of said rib being depressed inwardly to form indentations in the end wall which tend to flatten out under the pressure build-up in the battery casing.

7. The battery casing of claim 1 wherein said one end wall has on opposite lateral sides of said rib indentations extending transversely of the length of the rib which spans the width of the indentations.

8. The battery casing of claim 6 wherein said casing is made of resilient sheet metal and said main side walls form a cylindrical body having one end closed by a circular end wall which is said one end wall in which said at least one vent-forming rib is formed, and there being at least a pair of said ribs spaced from the center of said end wall and extending radially thereof, and said indentations being banana-shaped and extending and centered along the same circle concentric with the center of said one casing end wall, said vent-forming groove of each rib extending generally circumferentially of said circle.

9. The battery casing of claim 1, 5 or 8 wherein each rib has a generally sinusoidal shape.

10. The battery casing of claim 1, 5 or 8 wherein each rib has a generally sinusoidal shape which smoothly merges into the casing wall at the base of the rib thereof.

11. The battery casing of claim 1, 5 or 8 wherein each vent-forming groove viewed in transverse cross-section has a flat narrow bottom margin and outwardly flaring side margins.

12. The battery casing of claim 1, 5 or 8 wherein each vent-forming groove is a coined groove which has a consistent depth for substantially its entire length and has tapering end portions of a depth gradually decreasing toward the ends of the groove.

13. The battery casing of claim 1, 5 or 8 wherein each vent-forming groove is coined and has a consistent depth for substantially its entire length and has tapering end portions of a depth gradually decreasing toward the ends of the groove and merging with the sides of the rib at an angle of almost 180 degrees.

14. The battery casing of claim 1, 5 or 8 wherein each rib has a generally sinusoidal shape viewed in transverse cross section, and the length of each vent-forming groove thereof occupies such a limited extent of the sinusoidal contour of the rib that when it is centered thereupon the groove terminate no lower than about one-fourth of the height of the rib.

15. The battery casing of claim 1, 5 or 8 wherein each vent-forming groove occupies such a limited extent of the transverse contour of the rib that the ends thereof are spaced from the base of the rib a distance at least about the thickness of the thin wall portion in which the rib is formed.

16. The battery casing of claim 1, 5 or 8 wherein each vent-forming groove is a coined groove.

17. The battery casing of claims 1, 5, or 8 wherein said groove is coined and has a flat bottom and outwardly flaring sides, the ends of said groove being defined by outwardly flaring walls very gradually merging with the rib contour.

* * * * *